US009830703B2

United States Patent
Meyer et al.

(10) Patent No.: US 9,830,703 B2
(45) Date of Patent: Nov. 28, 2017

(54) MODEL-BASED THREE-DIMENSIONAL HEAD POSE ESTIMATION

(71) Applicant: NVIDIA CORPORATION, Santa Clara, CA (US)

(72) Inventors: Gregory P. Meyer, Champaign, IL (US); Shalini Gupta, San Francisco, CA (US); Iuri Frosio, San Jose, CA (US); Nagilla Dikpal Reddy, Palo Alto, CA (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 14/825,129

(22) Filed: Aug. 12, 2015

(65) Prior Publication Data

US 2017/0046827 A1      Feb. 16, 2017

(51) Int. Cl.
*G06K 9/00*         (2006.01)
*G06T 7/00*         (2017.01)

(52) U.S. Cl.
CPC ............ *G06T 7/004* (2013.01); *G06T 7/0053* (2013.01); *G06T 2207/10012* (2013.01)

(58) Field of Classification Search
None
See application file for complete search history.

(56) References Cited

U.S. PATENT DOCUMENTS

| | | | | |
|---|---|---|---|---|
| 6,115,052 A | * | 9/2000 | Freeman | G06T 13/40 345/419 |
| 2014/0362091 A1 | * | 12/2014 | Bouaziz | G06T 13/40 345/473 |
| 2016/0253807 A1 | * | 9/2016 | Jones | G06T 7/0046 382/154 |
| 2016/0307032 A1 | * | 10/2016 | Butler | G06K 9/00208 |

OTHER PUBLICATIONS

Iwama 2013, Wang et al., Nov. 27, 2013, pp. 1-23.*
Head pose—Optimization, Padeleris et al., 978-1-4673-1612-5, 2012, pp. 42-49.*

(Continued)

*Primary Examiner* — Jayesh A Patel
(74) *Attorney, Agent, or Firm* — Artegis Law Group, LLP

(57) ABSTRACT

One embodiment of the present invention sets forth a technique for estimating a head pose of a user. The technique includes acquiring depth data associated with a head of the user and initializing each particle included in a set of particles with a different candidate head pose. The technique further includes performing one or more optimization passes that include performing at least one iterative closest point (ICP) iteration for each particle and performing at least one particle swarm optimization (PSO) iteration. Each ICP iteration includes rendering the three-dimensional reference model based on the candidate head pose associated with the particle and comparing the three-dimensional reference model to the depth data. Each PSO iteration comprises updating a global best head pose associated with the set of particles and modifying at least one candidate head pose. The technique further includes modifying a shape of the three-dimensional reference model based on depth data.

20 Claims, 12 Drawing Sheets

(56) References Cited

OTHER PUBLICATIONS

Iwama 2013, Wang et al., Nov. 27, 2013, 1-23.*
Bais et al., "Registering Multiview Range Data to Create 3d Computer Objects", IEEE Transactions on Pattern Analysis and Machine Intelligence, 1995, 17(8):820-824.
Breitenstein, et al., "Real-Time Face Pose Estimation from Single Range Images", Digital Access to Scholarship at Harvard, CVPR 2008, IEEE Computer Society Conference on Computer Vision and Pattern Recognition, 2008, 8 pages.
Cai, et al., "3d Deformable Face Tracking with a Commodity Depth Camera", in ECCV, Springer 2010, pp. 229-242.
Chen et al., "Object Modelling by Registration of Multiple Range Images", Image and Vision Computing, 1992, 10 (3):145-155.
Clerc et al., "The Particle Swarm-Explosion, Stability, and Convergence in a Multidimensional Complex Space", IEEE Transactions on Evolutionary Computation, 2002, 6(1) pp. 58-73.
de Leva, "Adjustments to Zatsiorsky-Seluyanov's segment inertia parameters", Journal of Biomechanics, 29(9):1223—1230, 1996.
Eberhart et al., "Particle Swarm Optimization: Developments, Applications and Resources", In Proceedings of 8 the 2001 Congress on Evolutionary Computation, vol. 1, IEEE, 2001, pp. 81-86.
Fanelli, et al., "Random Forests for Real Time 3d Face Analysis", Int. J. Comput. Vision, Feb. 2013, 101(3):437— 458.
Fanelli, et al., "Real Time Head Pose Estimation with Random Regression Forests", in IEEE Conference on Computer Vision and Pattern Recognition, 2011, pp. 617-624.
Fanelli, et al., "Real Time Head Pose Estimation from Consumer Depth Cameras", Lecture Notes in Computer Science, in Pattern Recognition, Springer 2011, pp. 101-110.
Grest, et al., "Nonlinear Body Pose Estimation from Depth Images", In Pattern Recognition, Springer 2005, pp. 285-292.
Kennedy, "Particle Swarm Optimization", In Encyclopedia of Machine Learning, Springer 2010, pp. 760-766.
Malassiotis et al., "Robust Real-time 3d Head Pose Estimation from Range Data", Pattern Recognition, 2005, 38(8) pp. 1153-1165.
Murphy-Chutorian et al., 'Head pose estimation in computer vision: A survey", IEEE Transactions on Pattern Analysis and Machine Intelligence", 2009, 31(4):607-626.
Niese, et al., "A Novel Method for 3d Face Detection and Normalization", Journal of Multimedia, 2007, 2(5) 12 pages.

Oikonomidis, et al., "Efficient Model-based 3d Tracking of Hand Articulations using Kinect", In BMVC, vol. 1, 2011, p. 3.
Oikonomidis, et al., "Tracking the Articulated Motion of Two Strongly Interacting Hands", In IEEE Conference on Computer Vision and Pattern Recognition, 2012, pp. 1862-1869.
Padeleris, et al. "Head pose estimation on depth data based on Particle Swarm Optimization", In IEEE Computer Vision and Pattern Recognition Workshops, 2012, pp. 42-49.
Rekik, et al., "3d Face Pose Tracking using Low Quality Depth Cameras", In VISAPP, 2013, pp. 223-228.
Ruddarraju, et al., "Fast Multiple Camera Head Pose Tracking", Proceedings Vision Interface, 2001.
Rusinkiewicz et al., "Efficient Variants of the ICP Algorithm", In International Conference on 3-D Digital Imaging and Modeling, 2001, pp. 145-152.
Seemann, et al., "Head Pose Estimation Using Stereo Vision for Human-Robot Interaction," In IEEE International conference on Automatic Face and Gesture Recognition, 2004, pp. 626-631.
Shotton, et al., "Real-Time Human Pose Recognition in Parts from Single Depth Images", Communications of the ACM, 2013, 56(1):116-124.
Simon, et al., "Real-time 3-d Pose Estimation Using a High-Speed Range Sensor", In IEEE International Conference on Robotics and Automation, 1994, pp. 2235-2241.
Viola et al., "Robust Real-Time Face Detection", International Journal of Computer Vision, 2004, 57(2), pp. 137-154.
Weise, et al., "Fast 3d Scanning with Automatic Motion Compensation", In IEEE Conference on Computer Vision and Pattern Recognition, 2007, pp. 1-8.
Weise, et al., "Realtime performance-based facial animation", ACM Transactions on Graphics, 2011, 30(4):77.
Xia, et al., "Human detection using depth information by kinect", In IEEE Computer Vision and Pattern Recognition Workshops, Jun. 2011, pp. 15-22.
Yang et al., "Model-based Head Pose Tracking With Stereovision", In IEEE International Conference on Automatic Face and Gesture Recognition, 2002, pp. 255-260.
Chen Qian et al. "Realtime ans Robust Hand Tracking From Depth", 2014 IEEE Conference on Computer Vision and Pattern Recognition, pp. 1106-1113.

* cited by examiner

405

610

MODEL-BASED THREE-DIMENSIONAL HEAD POSE ESTIMATION

BACKGROUND OF THE INVENTION

Field of the Invention

Embodiments of the present invention relate generally to computer vision and, more specifically, to model-based three-dimensional head pose estimation.

Description of the Related Art

Estimating the three-dimensional (3D) pose (i.e., the rotation and position) of the head of a user is an important technical problem that has many applications in facial motion capture, human-computer interaction, and video conferencing. For example, head pose estimation is a prerequisite to gaze tracking, which has useful applications in cognitive science, automotive safety, and marketing research, to name a few. Additionally, head pose estimation is typically implemented in facial recognition and facial expression analysis.

Head pose estimation has traditionally been performed by capturing RGB images of a head of a user and analyzing the RGB images to identify facial features. For example, conventional head pose estimation techniques commonly implement rotation-specific classifiers that enable the pose of a head to be inferred by the shape, size, proportions, etc. of the facial features of a user. Alternatively, the RGB images may be registered to a 3D template associated with the face of the user.

However, conventional RGB-based head pose estimation techniques suffer from a number of drawbacks. In particular, RGB-based techniques typically produce unsatisfactory results when images are acquired in poor lighting conditions. For example, illumination variations, shadows, and occlusions may prevent accurate identification of the facial features of the user, leading to erroneous head pose estimation results. Additionally, RGB-based techniques typically require each user to initially perform a lengthy calibration sequence, through which the specific facial characteristics of each user are analyzed and stored via rotation-specific classifiers.

As the foregoing illustrates, more effective techniques for estimating the head pose of a user would be useful.

SUMMARY OF THE INVENTION

One embodiment of the present invention sets forth a method for estimating a head pose of a user. The method includes acquiring depth data associated with a head of the user and initializing each particle included in a set of particles with a different candidate head pose. Each candidate head pose comprises a rotation vector and a translation vector associated with a three-dimensional reference model. The method further includes performing one or more optimization passes. Each optimization pass includes performing at least one iterative closest point (ICP) iteration for each particle and performing at least one particle swarm optimization (PSO) iteration. Each ICP iteration includes rendering the three-dimensional reference model based on the candidate head pose associated with the particle, comparing the three-dimensional reference model to the depth data to determine at least one error value, and modifying the candidate head pose based on the at least one error value. Each PSO iteration includes updating a global best head pose associated with the set of particles and modifying at least one candidate head pose based on the global best head pose. The technique further includes modifying a shape of the three-dimensional reference model based on the depth data.

Further embodiments provide, among other things, a system and a non-transitory computer-readable medium configured to implement the method set forth above.

At least one advantage of the disclosed technique is that a three-dimensional head pose of a user can be efficiently determined regardless of lighting conditions. Additionally, the techniques described herein can be implemented with a wide variety of depth cameras without requiring a user to perform an initial calibration sequence.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
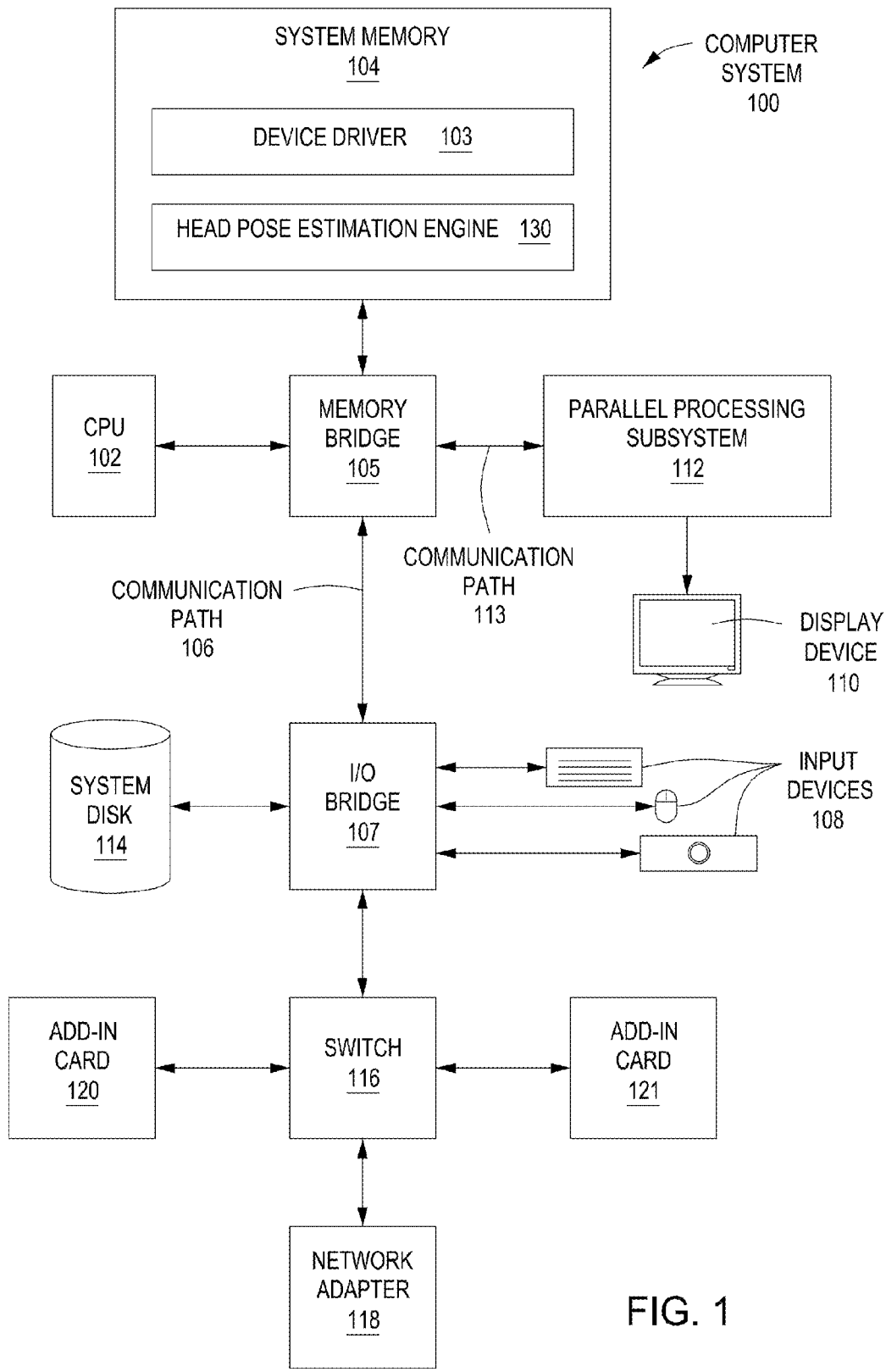
FIG. 1 is a block diagram of a computer system configured to implement one or more aspects of the present invention.

FIG. 1 is a block diagram of a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard, a mouse, or a camera, and forward the input information to CPU 102 for processing via communication path 106 and memory bridge 105. For example, I/O bridge 107 may receive depth images acquired via a depth camera and forward the depth images to the CPU 102 and/or the parallel processing subsystem 112 via memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 is part of a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112. System memory 104 further includes a head pose estimation engine 130 configured to acquire depth images (e.g., via one or more input devices 108, such as a depth camera and/or via the network adapter 118) and transmit the depth images to the CPU 102 and/or parallel processing unit 112 for analysis. The head pose estimation engine 130 may be further configured to render, via the CPU 102 and/or parallel processing unit 112, one or more images of a three-dimensional reference head model and/or three-dimensional reference face model and/or transmit the head pose information to another suitable module, such as a face recognition module, a gaze estimation module, etc.

In various embodiments, parallel processing subsystem 112 may be integrated with one or more other the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
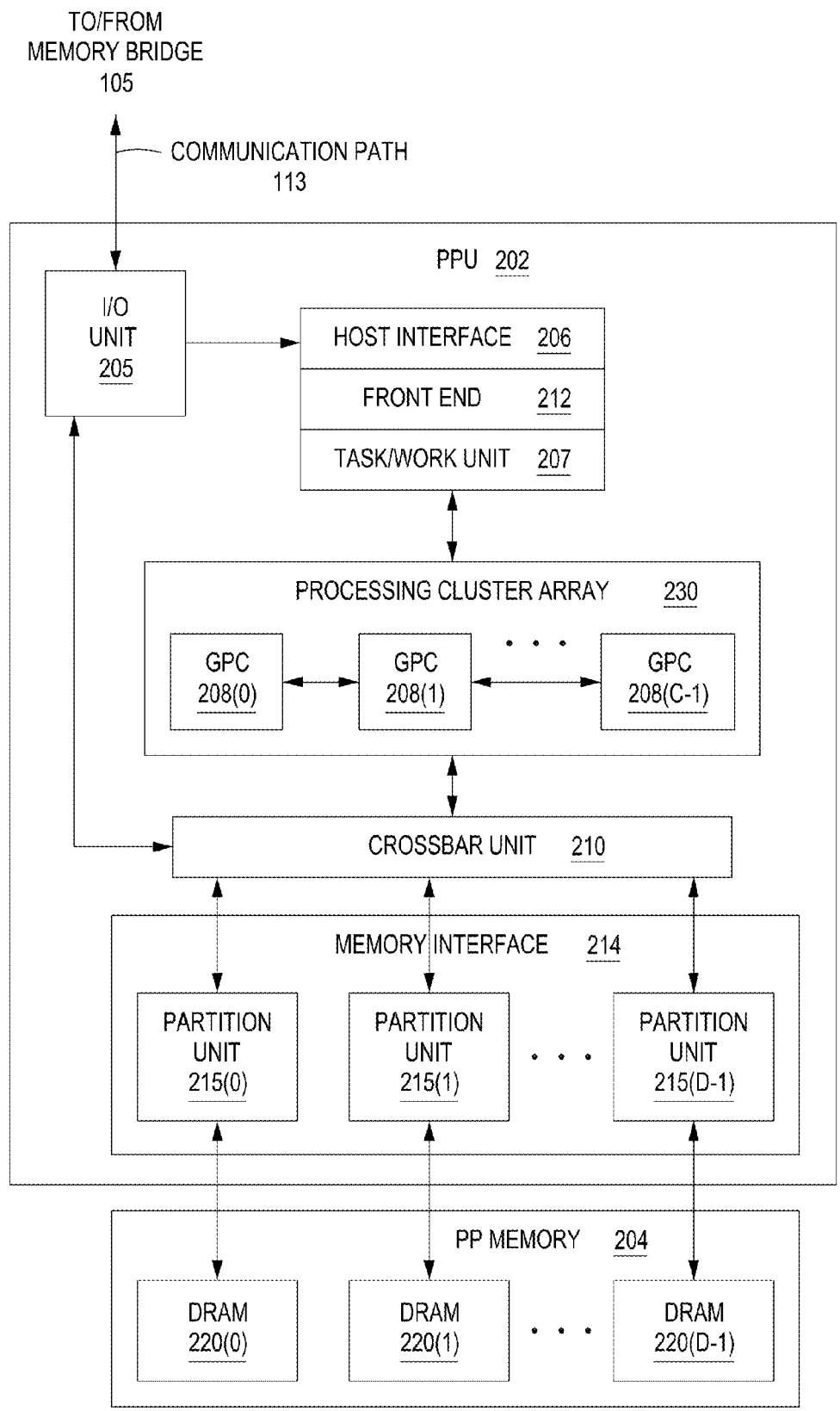
FIG. 2 is a block diagram of a parallel processing unit included in the parallel processing subsystem of FIG. 1, according to various embodiments of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations. Additionally, although FIG. 1 illustrates the head pose estimation engine 130 as being stored in system memory 104, in other embodiments, the head pose estimation engine 130 may be stored in the PP memory 204 for execution by the parallel processing subsystem 112.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system of chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C 1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D 1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPCs 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

Graphics Pipeline Architecture

Figure 3:
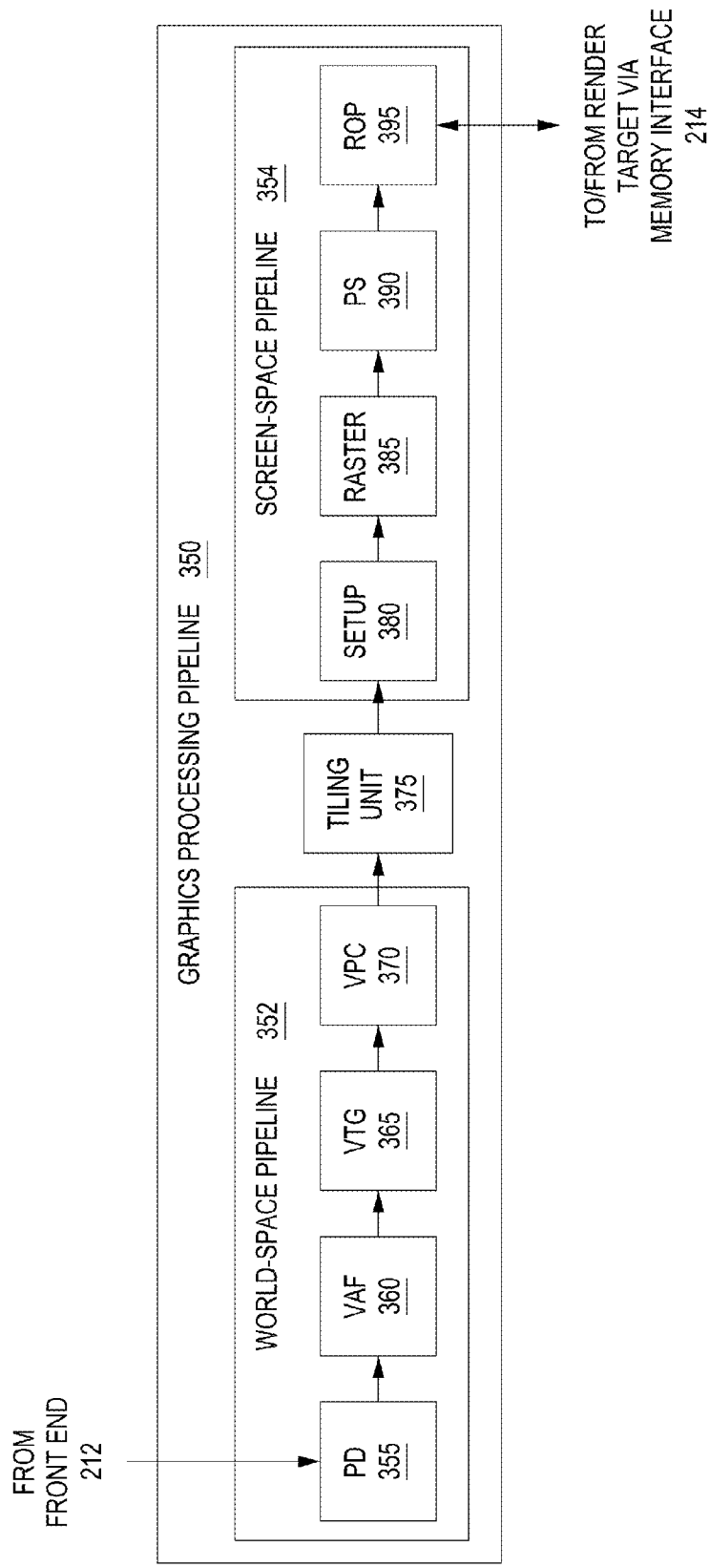
FIG. 3 is a conceptual diagram of a graphics processing pipeline that may be implemented within the parallel processing unit of FIG. 2, according to various embodiments of the present invention.

FIG. 3 is a conceptual diagram of a graphics processing pipeline 350 that may be implemented within PPU 202 of FIG. 2, according to one embodiment of the present invention. As shown, the graphics processing pipeline 350 includes, without limitation, a primitive distributor (PD) 355; a vertex attribute fetch unit (VAF) 360; a vertex, tessellation, geometry processing unit (VTG) 365; a viewport scale, cull, and clip unit (VPC) 370; a tiling unit 375, a setup unit (setup) 380, a rasterizer (raster) 385; a fragment processing unit, also identified as a pixel shading unit (PS) 390, and a raster operations unit (ROP) 395.

The PD 355 collects vertex data associated with high-order surfaces, graphics primitives, and the like, from the front end 212 and transmits the vertex data to the VAF 360.

The VAF 360 retrieves vertex attributes associated with each of the incoming vertices from shared memory and stores the vertex data, along with the associated vertex attributes, into shared memory.

The VTG 365 is a programmable execution unit that is configured to execute vertex shader programs, tessellation programs, and geometry programs. These programs process the vertex data and vertex attributes received from the VAF 360 and produce graphics primitives, as well as color values, surface normal vectors, and transparency values at each vertex for the graphics primitives for further processing within the graphics processing pipeline 350. Although not explicitly shown, the VTG 365 may include, in some embodiments, one or more of a vertex processing unit, a tessellation initialization processing unit, a task generation unit, a task distributor, a topology generation unit, a tessellation processing unit, and a geometry processing unit.

The vertex processing unit is a programmable execution unit that is configured to execute vertex shader programs, lighting and transforming vertex data as specified by the vertex shader programs. For example, the vertex processing unit may be programmed to transform the vertex data from an object-based coordinate representation (object space) to an alternatively based coordinate system such as world-space or normalized device coordinates (NDC) space. The vertex processing unit may read vertex data and vertex attributes that is stored in shared memory by the VAF and may process the vertex data and vertex attributes. The vertex processing unit 415 stores processed vertices in shared memory.

The tessellation initialization processing unit is a programmable execution unit that is configured to execute tessellation initialization shader programs. The tessellation initialization processing unit processes vertices produced by the vertex processing unit and generates graphics primitives known as patches. The tessellation initialization processing unit also generates various patch attributes. The tessellation initialization processing unit then stores the patch data and patch attributes in shared memory. In some embodiments, the tessellation initialization shader program may be called a hull shader or a tessellation control shader.

The task generation unit retrieves data and attributes for vertices and patches from shared memory. The task generation unit generates tasks for processing the vertices and patches for processing by later stages in the graphics processing pipeline 350.

The task distributor redistributes the tasks produced by the task generation unit. The tasks produced by the various instances of the vertex shader program and the tessellation initialization program may vary significantly between one graphics processing pipeline 350 and another. The task distributor redistributes these tasks such that each graphics processing pipeline 350 has approximately the same workload during later pipeline stages.

The topology generation unit retrieves tasks distributed by the task distributor. The topology generation unit indexes the vertices, including vertices associated with patches, and computes (U,V) coordinates for tessellation vertices and the indices that connect the tessellated vertices to form graphics primitives. The topology generation unit then stores the indexed vertices in shared memory.

The tessellation processing unit is a programmable execution unit that is configured to execute tessellation shader programs. The tessellation processing unit reads input data from and writes output data to shared memory. This output data in shared memory is passed to the next shader stage, the geometry processing unit 445 as input data. In some embodiments, the tessellation shader program may be called a domain shader or a tessellation evaluation shader.

The geometry processing unit is a programmable execution unit that is configured to execute geometry shader programs, thereby transforming graphics primitives. Vertices are grouped to construct graphics primitives for processing, where graphics primitives include triangles, line segments, points, and the like. For example, the geometry processing unit may be programmed to subdivide the graphics primitives into one or more new graphics primitives and calculate parameters, such as plane equation coefficients, that are used to rasterize the new graphics primitives.

The geometry processing unit transmits the parameters and vertices specifying new graphics primitives to the VPC 370. The geometry processing unit may read data that is stored in shared memory for use in processing the geometry data. The VPC 370 performs clipping, culling, perspective correction, and viewport transform to determine which graphics primitives are potentially viewable in the final rendered image and which graphics primitives are not potentially viewable. The VPC 370 then transmits processed graphics primitives to the tiling unit 375.

The tiling unit 375 is a graphics primitive sorting engine that resides between a world-space pipeline 352 and a screen-space pipeline 354, as further described herein. Graphics primitives are processed in the world-space pipeline 352 and then transmitted to the tiling unit 375. The screen-space is divided into cache tiles, where each cache tile is associated with a portion of the screen-space. For each graphics primitive, the tiling unit 375 identifies the set of cache tiles that intersect with the graphics primitive, a process referred to herein as "tiling." After tiling a certain number of graphics primitives, the tiling unit 375 processes the graphics primitives on a cache tile basis, where graphics primitives associated with a particular cache tile are transmitted to the setup unit 380. The tiling unit 375 transmits graphics primitives to the setup unit 380 one cache tile at a time. Graphics primitives that intersect with multiple cache tiles are typically processed once in the world-space pipeline 352, but are then transmitted multiple times to the screen-space pipeline 354.

Such a technique improves cache memory locality during processing in the screen-space pipeline 354, where multiple memory operations associated with a first cache tile access a region of the L2 caches, or any other technically feasible cache memory, that may stay resident during screen-space processing of the first cache tile. Once the graphics primitives associated with the first cache tile are processed by the screen-space pipeline 354, the portion of the L2 caches associated with the first cache tile may be flushed and the tiling unit may transmit graphics primitives associated with a second cache tile. Multiple memory operations associated with a second cache tile may then access the region of the L2 caches that may stay resident during screen-space processing of the second cache tile. Accordingly, the overall memory traffic to the L2 caches and to the render targets may be reduced. In some embodiments, the world-space computation is performed once for a given graphics primitive irrespective of the number of cache tiles in screen-space that intersects with the graphics primitive.

The setup unit 380 receives vertex data from the VPC 370 via the tiling unit 375 and calculates parameters associated with the graphics primitives, including, without limitation, edge equations, partial plane equations, and depth plane equations. The setup unit 380 then transmits processed graphics primitives to rasterizer 385.

The rasterizer 385 scan converts the new graphics primitives and transmits fragments and coverage data to the pixel shading unit 390. Additionally, the rasterizer 385 may be configured to perform z culling and other z-based optimizations.

The pixel shading unit 390 is a programmable execution unit that is configured to execute fragment shader programs, transforming fragments received from the rasterizer 385, as specified by the fragment shader programs. Fragment shader programs may shade fragments at pixel-level granularity, where such shader programs may be called pixel shader programs. Alternatively, fragment shader programs may shade fragments at sample-level granularity, where each pixel includes multiple samples, and each sample represents a portion of a pixel. Alternatively, fragment shader programs may shade fragments at any other technically feasible granularity, depending on the programmed sampling rate.

In various embodiments, the fragment processing unit 460 may be programmed to perform operations such as perspective correction, texture mapping, shading, blending, and the like, to produce shaded fragments that are transmitted to the ROP 395. The pixel shading unit 390 may read data that is stored in shared memory.

The ROP 395 is a processing unit that performs raster operations, such as stencil, z test, blending, and the like, and transmits pixel data as processed graphics data for storage in graphics memory via the memory interface 214, where graphics memory is typically structured as one or more render targets. The processed graphics data may be stored in graphics memory, parallel processing memory 204, or system memory 104 for display on display device 110 or for further processing by CPU 102 or parallel processing subsystem 112. In some embodiments, the ROP 395 is configured to compress z or color data that is written to memory and decompress z or color data that is read from memory. In various embodiments, the ROP 395 may be located in the memory interface 214, in the GPCs 208, in the processing cluster array 230 outside of the GPCs, or in a separate unit (not shown) within the PPUs 202.

The graphics processing pipeline may be implemented by any one or more processing elements within PPU 202. For example, a streaming multiprocessor (not shown) could be configured to perform the functions of one or more of the VTG 365 and the pixel shading unit 390. The functions of the PD 355, the VAF 360, the VPC 450, the tiling unit 375, the setup unit 380, the rasterizer 385, and the ROP 395 may also be performed by processing elements within a particular GPC 208 in conjunction with a corresponding partition unit 215. Alternatively, graphics processing pipeline 350 may be implemented using dedicated fixed-function processing elements for one or more of the functions listed above. In various embodiments, PPU 202 may be configured to implement one or more graphics processing pipelines 350.

In some embodiments, the graphics processing pipeline 350 may be divided into a world-space pipeline 352 and a screen-space pipeline 354. The world-space pipeline 352 processes graphics objects in 3D space, where the position of each graphics object is known relative to other graphics objects and relative to a 3D coordinate system. The screen-space pipeline 354 processes graphics objects that have been projected from the 3D coordinate system onto a 2D planar surface representing the surface of the display device 110. For example, the world-space pipeline 352 could include pipeline stages in the graphics processing pipeline 350 from the PD 355 through the VPC 370. The screen-space pipeline 354 could include pipeline stages in the graphics processing pipeline 350 from the setup unit 380 through the ROP 395. The tiling unit 375 would follow the last stage of the world-space pipeline 352, namely, the VPC 370. The tiling unit 375 would precede the first stage of the screen-space pipeline 354, namely, the setup unit 380.

In some embodiments, the world-space pipeline 352 may be further divided into an alpha phase pipeline and a beta phase pipeline. For example, the alpha phase pipeline could include pipeline stages in the graphics processing pipeline 350 from the PD 355 through the task generation unit. The beta phase pipeline could include pipeline stages in the graphics processing pipeline 350 from the topology generation unit through the VPC 370. The graphics processing pipeline 350 performs a first set of operations during processing in the alpha phase pipeline and a second set of operations during processing in the beta phase pipeline. As used herein, a set of operations is defined as one or more instructions executed by a single thread, by a thread group, or by multiple thread groups acting in unison.

In a system with multiple graphics processing pipeline 350, the vertex data and vertex attributes associated with a set of graphics objects may be divided so that each graphics processing pipeline 350 has approximately the same amount of workload through the alpha phase. Alpha phase processing may significantly expand the amount of vertex data and vertex attributes, such that the amount of vertex data and vertex attributes produced by the task generation unit is significantly larger than the amount of vertex data and vertex attributes processed by the PD 355 and VAF 360. Further, the task generation unit associated with one graphics processing pipeline 350 may produce a significantly greater quantity of vertex data and vertex attributes than the task generation unit associated with another graphics processing pipeline 350, even in cases where the two graphics processing pipelines 350 process the same quantity of attributes at the beginning of the alpha phase pipeline. In such cases, the task distributor redistributes the attributes produced by the alpha phase pipeline such that each graphics processing pipeline 350 has approximately the same workload at the beginning of the beta phase pipeline.

Please note, as used herein, references to shared memory may include any one or more technically feasible memories, including, without limitation, a local memory shared by one or more SMs 310, or a memory accessible via the memory interface 214, such as a cache memory, parallel processing memory 204, or system memory 104. Please also note, as used herein, references to cache memory may include any one or more technically feasible memories, including, without limitation, an L1 cache, an L1.5 cache, and the L2 caches.

Model-Based Three-Dimensional Head Pose Estimation

As previously described herein, estimating three-dimensional (3D) head pose is an important operation that has many applications in facial motion capture, human-computer interaction, and video conferencing. Head pose estimation has traditionally been performed by capturing RGB images and analyzing the RGB images to identify facial features in order to infer head pose from the shape, size, and/or proportions of the facial features. However, as described above, conventional RGB-based head pose estimation techniques suffer from a number of drawbacks. In particular, RGB-based techniques typically produce unsatisfactory results when images are acquired in poor lighting conditions and typically require each user to initially perform a lengthy calibration sequence in order to generate rotation-specific classifiers based on the user's specific facial characteristics. Additionally, RGB-based and conventional depth-based approaches do not achieve sufficient accuracy for applications such as gaze detection.

Accordingly, in the various embodiments described below, depth-based techniques are implemented in order to more efficiently estimate the orientation of a head of a user. In contrast to RGB-based techniques, depth-based techniques are capable of more accurately estimating head pose regardless of lighting conditions. Additionally, the depth-based techniques described below generally do not require a user to perform an initial calibration sequence. Instead, a reference 3D model representing an average face of a user may be implemented for initial head pose estimations, and the 3D model may then be iteratively refined as depth data associated with the user's head is acquired and analyzed. Such techniques are described below in further detail in conjunction with FIGS. 4-9C.

Head pose may be estimated to a high degree of accuracy by combining several concepts. First, the location of the head of the user within a depth image is determined using an adaptive matched filter. Then, a 3D reference model of a face (e.g., an average face model) is registered to depth data associated with a face of a user via a combination of particle swarm optimization (PSO) and iterative closest point (ICP) techniques. Next, vertices associated with the 3D reference model may be weighted and updated to assign a higher level of importance to more useful (e.g., visible and/or reliable) portions of the face, enabling head pose to be more accurately estimated in instances of extreme poses and/or partial occlusions. In general, depth data associated with a head of a user may be acquired via any type of depth sensor, including a Microsoft® Kinect® sensor, a SoftKinetic® depth sensor (e.g., a SoftKinetic® DS325 time-of-flight camera), and/or any other technically feasible sensor for acquiring depth measurements (e.g., stereo cameras).

Head Localization

Figure 4:
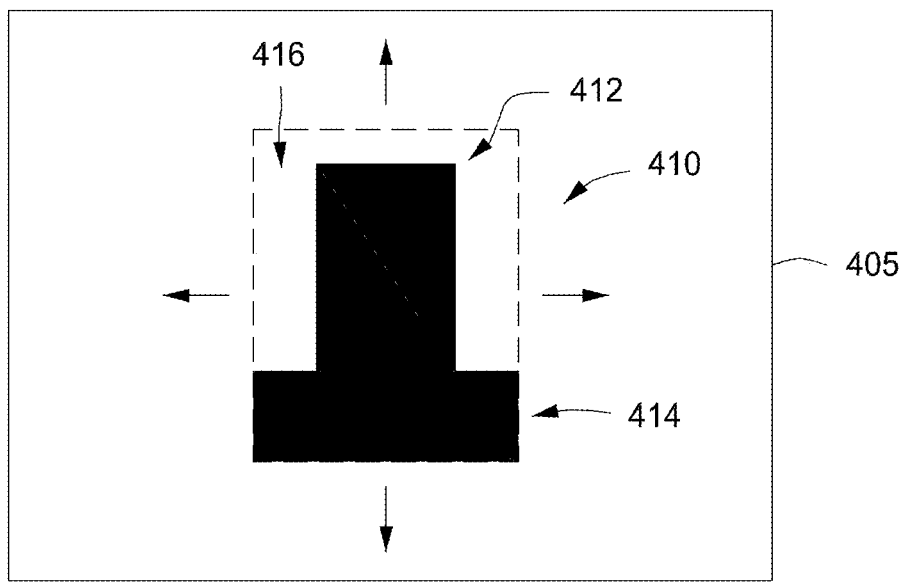
FIG. 4 illustrates an adaptive matched filter for determining the location of a head of a user within a depth image, according to various embodiments of the present invention.

FIG. 4 illustrates an adaptive matched filter 410 for determining the location of a head of a user within a depth image 405, according to various embodiments of the present invention. As shown in FIG. 4A, an adaptive matched filter 410 may include a head region 412 and a shoulder region 414. In some embodiments, the head region 412 and shoulder region 414 of the adaptive matched filter 410 are assigned a value of 1, while regions 416 outside of the head region 412 and shoulder region 414 are assigned a value of −1.

In operation, the head pose estimation engine 130 positions the adaptive matched filter 410 at a variety of different locations within a depth image 405. For each location at which the adaptive matched filter 410 is positioned, the head pose estimation engine 130 sizes the adaptive matched filter 410 to match the expected size of an average human head at the depth of the sample location. At each location, the head pose estimation engine 130 compares values associated with the depth image 405 to values located at corresponding positions in the adaptive matched filter 410. The location at which values of the adaptive matched filter 410 exhibit the strongest response or correlation to depth values associated with the depth image 405 is then used to determine the location of the head of the user within the depth image 405. For example, the location of the head of the user within the depth image 405 may be determined based on the location of the head region 412 included in the adaptive matched filter 410. Additional details of the head localization technique—including exemplary algorithms for determining a correlation between values associated with the depth image 405 and values specified by the adaptive matched filter 410—are described below in conjunction with FIGS. 5A-5D.

Figure 5A:
FIGS. 5A-5D illustrate a head localization technique for determining the location of a head of user within a depth image via the adaptive matched filter of FIG. 4, according to various embodiments of the present invention.
Figure 5B:
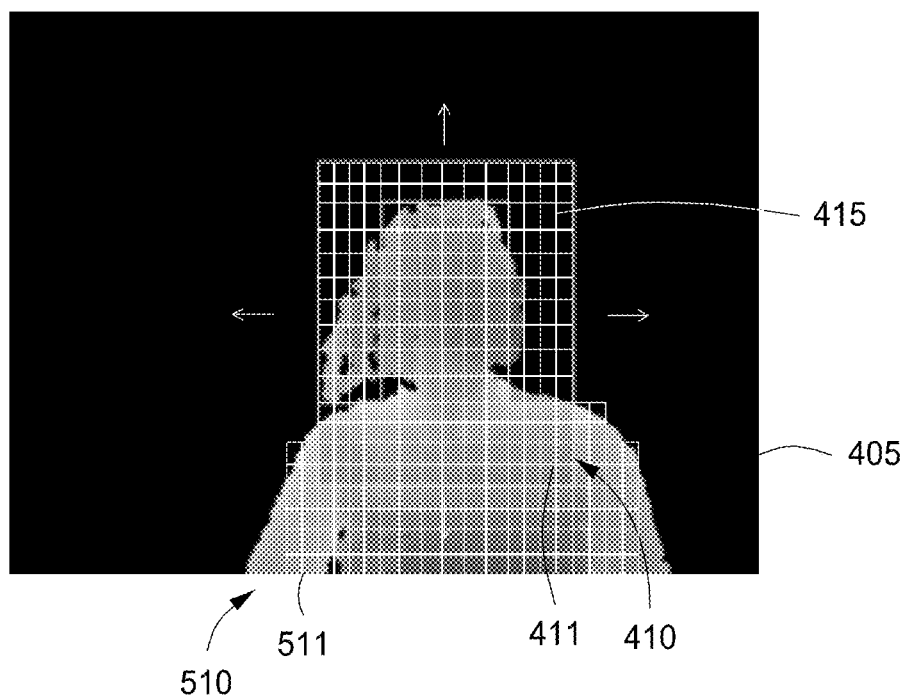

FIGS. 5A-5D illustrate a head localization technique for determining the location of a head of user within a depth image 405 via the adaptive matched filter 410 of FIG. 4, according to various embodiments of the present invention. FIGS. 5A and 5B include an RGB image of a user (provided for clarity of explanation) and a corresponding depth image 405 of the user, respectively.

In various embodiments, the head pose estimation engine 130 first analyzes a depth image 405 to determine the silhouette of a user (e.g., via thresholding). A binary mask is then defined to identify pixels that are located inside of the boundary of the user's silhouette, referred to herein as active pixels 511. In some embodiments, the binary mask may be defined based on Equation 1, where the depth measured at pixel (i,j) is denoted by $d_o(i,j)$, the user is positioned at a depth between $d_m$ and $d_M$, and the active pixels 511 are assigned a value $\epsilon(i,j)$ of 0 or 1.

$$\epsilon(i,j) = d_m < d_o(i,j) < d_M \qquad \text{(Eq. 1)}$$

Further, the expected pixel width $w(i,j)$ and height $h(i,j)$ of a centered head at (i,j) may be obtained by Equation 2, where f is the camera focal length, and w and h are the width and height of an average human head, respectively.

$$w(i,j) = fw/d_o(i,j), \; h(i,j) = fh/d_o(i,j) \qquad \text{(Eq. 2)}$$

Then, for each active pixel (i,j) 511, the head pose estimation engine 130 resizes the adaptive matched filter 410 relative to the approximated width $w(i,j)$ and height $h(i,j)$ of the head of the user and convolves the adaptive matched filter 410 with the binary mask $\epsilon(i,j)$ to obtain a score $s(i,j)$. The location (i,j) having the highest score is then determined to be the proper alignment between the adaptive matched filter 410 and the silhouette.

For example, with reference to FIG. 5B, when the adaptive matched filter 410 is properly aligned with the silhouette of the user, the non-negative values associated with the sample locations 411 of the head region 412 and shoulder region 414 of the adaptive matched filter 410 are multiplied by positive values associated with the active pixels 511 of the binary mask $\epsilon(i,j)$. Further, the majority of the negative values associated with the sample locations 415 of the region 416 that is outside of the head region 412 and shoulder region 414 are multiplied by zero values (e.g., values associated with the non-active pixels of the binary mask є(i,j) that are outside of the silhouette of the user). By contrast, when the adaptive matched filter 410 is not properly aligned with the silhouette of the user, negative values included in the adaptive matched filter 410 are multiplied by positive values associated with the active pixels 511 of the binary mask є(i,j), generating a negative response. Accordingly, when the adaptive matched filter 410 is positioned at the location shown in FIG. 5B, a maximum score s(i,j) is obtained.

In some embodiments, the adaptive matched filter 410 is aligned with the silhouette of the user via integral image techniques. For example, an integral image technique may be used to efficiently compute the output of a box filter on a depth image 405. Once the integral image is available, each pixel of the box filtered depth image 405 can be computed by summing four pixels in the integral image.

Figure 5C:
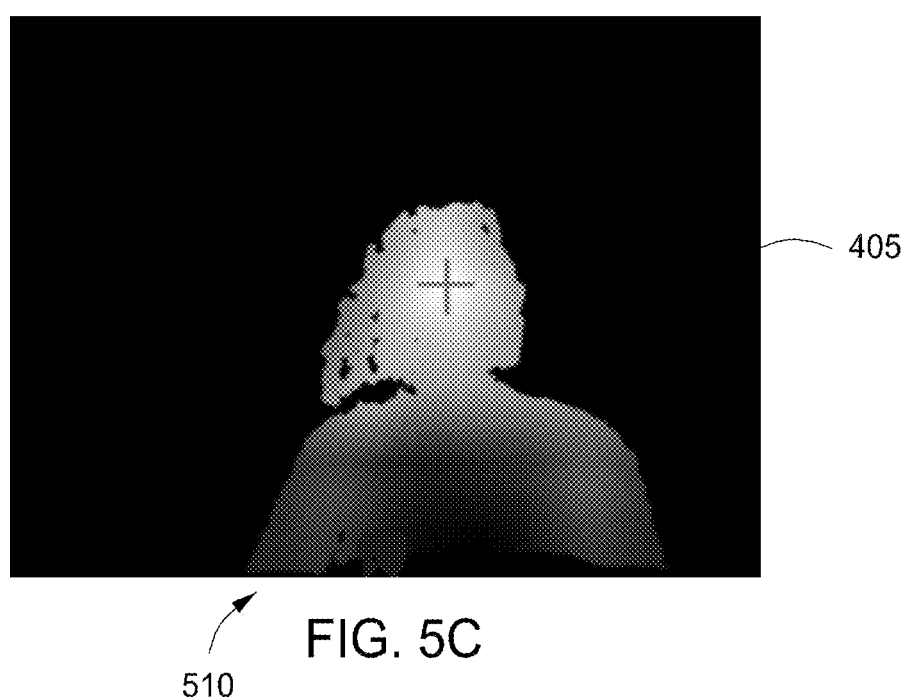
Figure 5D:
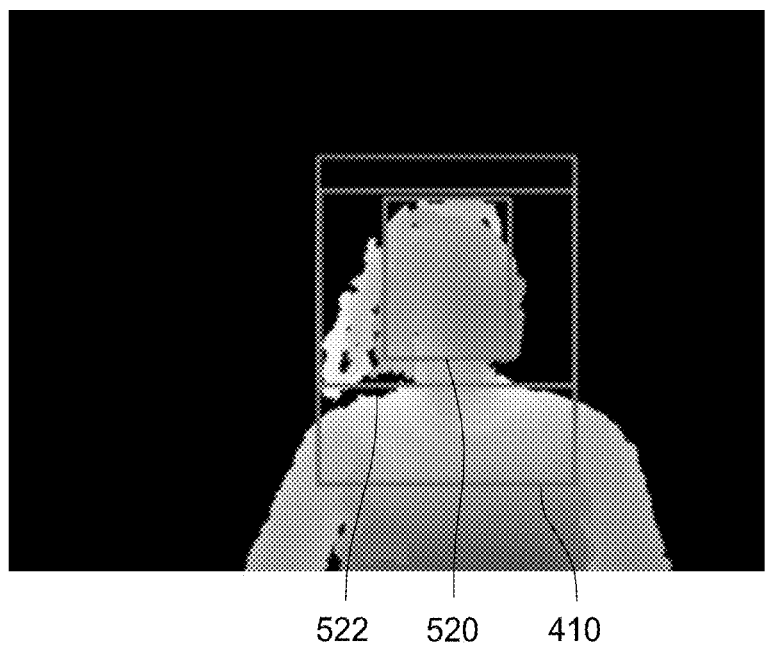

Once the adaptive matched filter 410 is properly aligned with the silhouette of the user, the head pose estimation engine 130 determines the location of the head of the user based on the location of the head region 412, as shown in FIG. 5C. The identified head region 520 may have a size of $w(i_h,j_h) \times h(i_h,j_h)$, as shown in FIG. 5D. The identified head region 520 is then enlarged to generate an enlarged head region 522 in order to ensure that the head is contained entirely therein.

Head Pose Estimation

Figure 6A:
FIGS. 6A-6C illustrate a 3D reference model mapped to depth data in which a user is looking up and to the left, according to various embodiments of the present invention.
Figure 6B:
Figure 6C:
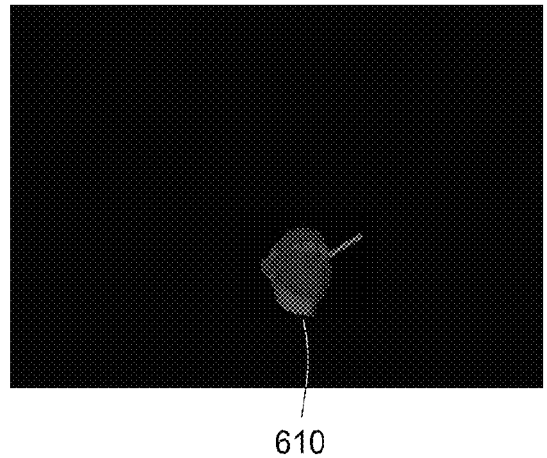
Figure 7A:
FIGS. 7A-7C illustrate a 3D reference model mapped to depth data in which a user is looking down and to the right, according to various embodiments of the present invention.
Figure 7B:
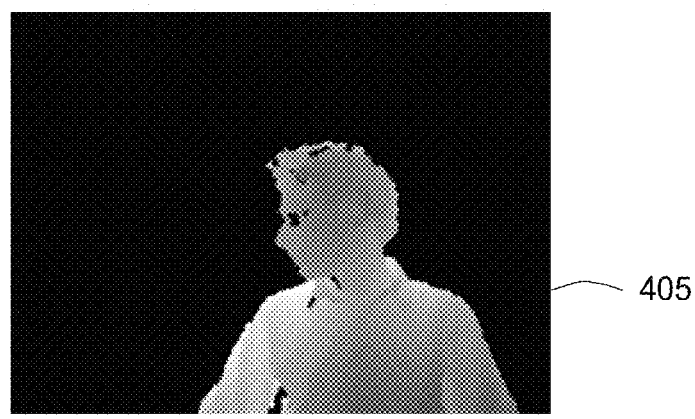
Figure 7C:
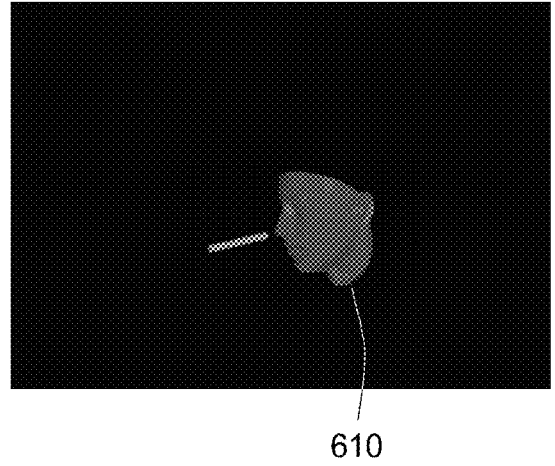

After the location of the head of the user within a depth image 405 is determined, the head pose estimation engine 130 estimates the head pose by registering a 3D model of a reference head to the 3D depth data associated with the face of the user. For example, FIGS. 6A-6C illustrate a 3D reference model 610 mapped to depth data in which a user is looking up and to the left (from the perspective of the user). More specifically, FIGS. 6A and 6B include an RGB image of a user (provided only for clarity of explanation) and a corresponding depth image 405 of the user, respectively. Additionally, FIG. 6C illustrates a rendered 3D reference model 610 that has been rotated and translated based on a final head pose estimate determined by the head pose estimation engine 130. FIG. 6C further illustrates the weighting coefficients (shown in red) assigned to various positions (e.g., vertices) on the 3D reference model 610. Similarly, FIGS. 7A-7C illustrate a 3D reference model 610 mapped to depth data in which a user is looking down and to the right (from the perspective of the user). FIG. 7C illustrates the rendered 3D reference model 610, as rotated and translated based on the final head pose estimate determined by the head pose estimation engine 130. FIG. 7C further illustrates the weighting coefficients (shown in red) assigned to various positions (e.g., vertices) on the 3D reference model 610. Various techniques for estimating the head pose of a user based on a 3D reference model 610 are described below in further detail in conjunction with FIGS. 8-9C.

Once the head of the user is localized within a depth image 405, a 3D reference model 610 may be mapped to the depth data by implementing a combination of particle swarm optimization (PSO) and iterative closest point (ICP) techniques. In general, any technically feasible combination of PSO and ICP may be implemented in the embodiments described herein. In various embodiments, the 3D reference model 610 may include a morphable model of an average human head and/or face, such as the 3D Basel Face Model published by the Computer Science Department of the University of Basel. For example, the 3D reference model 610 may include a facial surface having a set of 3D vertices $S=(v_1, v_2, \ldots, v_N)$ that can be represented by a linear combination of an average 3D face ($\mu$) (e.g., the 3D Basel Face Model) and one or more 3D base face shapes ($s_i$) according to Equation 3. In other embodiments, the 3D reference model 610 could include one or more depth images of the user acquired under a canonical pose, or a 3D model specific to a particular user and constructed by acquiring multiple depth images of the user's face.

$$S=\mu+\Sigma_i \alpha_i s_i \qquad \text{(Eq. 3)}$$

Additionally, because portions of a user's face may not match the 3D reference model 610 (e.g., due to facial hair, eye-wear, a hat, etc.), a weighting vector including one or more weighting coefficients $W=(w_1, w_2, \ldots, w_N)$ may be used to represent the confidence of specific vertices included in the 3D reference model 610. In some embodiments, for the initial depth image 405 acquired for a particular user, the head pose estimation engine 130 sets the 3D reference model 610 to the average face ($\mu$) and sets the weight vector W to unity for all vertices. Then, as subsequent depth images 405 are acquired and processed by the head pose estimation engine 130, the weighting coefficients are updated to reflect the correspondence between the 3D reference model 610 and the specific characteristics and pose of the head of the user.

In order to accurately estimate the head pose of the user, the head pose estimation engine 130 generates an error value for each of a plurality of candidate head poses of the 3D reference model 610. In various embodiments, each candidate head pose is defined by a 6-dimensional vector $x=(\theta_x, \theta_y, \theta_z, t_x, t_y, t_z)$, where $\theta_i$ and $t_i$ represent a rotation about and a translation along the axis i. Each candidate head pose x is evaluated for an observed depth image 405 $d_o$ by first rendering a hypothetical depth image $d_h$ and a weight image $w_h$ of the 3D reference model 610 in the pose x according to Equation 4, where $S_k$ and $W_k$ are the current shape and weight of the 3D reference model 610, and K is an intrinsic calibration matrix associated with the sensor from which the depth images 405 are acquired. Because the head pose estimation engine 130 may iteratively update the shape of the 3D reference model 610 to better match the head of user observed in the acquired depth images 405, convergence towards an accurate head pose estimate may not be reached until several depth images 405 have been acquired and processed by the head pose estimation engine 130.

$$(d_h,w_h)=\text{Render}(x,S_k,W_k,K) \qquad \text{(Eq. 4)}$$

Each depth pixel at location (i,j) of $d_o$ and $d_h$ has corresponding 3D vertices $v_o(i,j)$ and $v_h(i,j)$, respectively. Additionally, each vertex in $v_h(i,j)$ has a normal vector $n_h(i,j)$ that may be computed based on the relative positions of the neighboring vertices.

In some embodiments, depth images 405 may be filtered to remove erroneous depth data, which is commonly observed in low-cost depth cameras. Additionally, a subset of reliable vertices, P, may be generated according to Equation 5, where O and H are the sets of valid (non-zero) pixels in the observed depth image 405 $d_o$ and the hypothetical depth image $d_h$, respectively. In various embodiments, τ may be set to a value of approximately 3 centimeters.

$$P=\{(i,j) | \|v_o(i,j)-v_h(i,j)\| < \tau, (i,j) \in O \cap H\} \qquad \text{(Eq. 5)}$$

An error value E(x) is then computed for each candidate head pose to quantify the discrepancy between the observed depth image 405 $d_o$ and the hypothetical depth image $d_h$ according to Equations 6-8, where $E_v(x)$ measures the point-to-plane distance between corresponding vertices $v_o(i,j)$ and $v_h(i,j)$, and $E_c(x)$ measures the extent to which the observed depth image 405 $d_o$ and the hypothetical depth image $d_h$ coincide with each other (e.g., overlap with each other). Additionally, the parameter $\lambda$ is implemented to designate the relative importance of each of the terms. In some embodiments, $\lambda$ may be set to approximately 350.

$$E(x)=E_v(x)+\lambda E_c(x) \tag{Eq. 6}$$

$$E_v(x) = \frac{\sum_{(i,j)\in P} w_h(i,j)[(v_o(i,j)-v_h(i,j))^T n_h(i,j)]^2}{\sum_{(i,j)\in P} w_h(i,j)} \tag{Eq. 7}$$

$$E_c(x)=[1-\Sigma_{(i,j)\in P} w_h(i,j)/\Sigma_{(i,j)\in H} w_h(i,j)]^2 \tag{Eq. 8}$$

In order to estimate the head pose of the user, the head pose estimation engine 130 may implement a combination of particle swarm optimization (PSO) and iterative closest point (ICP) techniques. PSO implements a set of particles that evolve through social interactions over a series of generations to search for a global best solution in a non-convex parameter space. For head pose estimation, each particle included in the set of particles represents a head pose $x$ and has a corresponding error value $E(x)$, which may be computed based on Equation 6, described above.

In various embodiments, the head pose estimation engine 130 keeps track of the head pose $x^*$ where each particle observed the lowest error value $E(x^*)$ across all generations. The head pose estimation engine 130 further tracks the global best head pose $x$, indicated by $x_g^*$, across all particles and all generations. Then, at generation $t$, the head pose estimation engine 130 may stochastically update the head pose $x$ and the velocity $u$ assigned to each particle based on the position of the particle relative to $x^*$ and/or $x_g^*$. For example, in some embodiments, the head pose $x$ and velocity $u$ assigned to one or more of the particles may be updated based on Equations 9 and 10, where $\alpha$, $\beta$, and $\gamma$ are the cognitive, social, and constriction factors, respectively, and $\xi_1$ and $\xi_2$ are uniform random variables $\in[0,1]$. In various embodiments, $\alpha$ and $\beta$ may be set to approximately 2.0, and $\gamma$ may be set to approximately 0.7.

$$x_{t+1}=x_t+u_{t+1} \tag{Eq. 9}$$

$$u_{t+1}=\gamma(u_t+\alpha\xi_1(x^*-x_t)+\beta\xi_2(x_g^*-x_t)) \tag{Eq. 10}$$

During the first generation (t=0), the head poses $x$ assigned to the particles may be initialized randomly, and the velocities of the particles may be set to zero. In some embodiments, the particles are initialized by randomly sampling a normal distribution of head poses $x$ having a mean set to a frontal head pose (e.g., with the head facing the depth camera). For subsequent depth images 405, a first portion (e.g., half) of the particles may be initialized randomly (e.g., as described above), and second a portion may be initialized based on the estimated head pose $x$ associated with the previous depth image 405. For example, the second portion of particles may be initialized by randomly sampling a normal distribution of head poses $x$ with a mean set to the final estimated head pose $x$ associated with the previous depth image 405.

In various embodiments, the head pose estimation engine 130 may prevent unlikely head poses from being assigned to particles by bounding one or more of the rotation parameters a to specific ranges. For example, in some embodiments, rotation about the x, y, and/or z axes may be restricted as follows: $\theta_x \in[-60°, 60°]$ for pitch, $\theta_y \in[-90°, 90°]$ for yaw, and $\theta_z \in[-45°, 45°]$ for roll. Additionally, for translation, the head pose estimation engine 130 may force the centroid of the 3D reference model 610 to remain within a threshold distance (e.g., approximately 10 centimeters) from the center of the head of the user detected during head localization.

For each particle and for each generation, the head pose estimation engine 130 may perform multiple iterations of ICP before and/or after updating the positions and/or velocities of the particles via PSO. In various embodiments, approximately three ICP iterations are performed for each of approximately 10 particles for each PSO update. Additionally, in various embodiments, approximately 5 PSO generations are performed. Accordingly, in such embodiments, the head pose estimation engine 130 may render and analyze (e.g., via the parallel processing subsystem 112) hypothetical depth images $d_h$ for approximately 150 different head pose candidates.

In each ICP iteration, the head pose estimation engine 130 transforms the vertices $v_h(i,j)$ in vertex map $v_h$ and projects the vertices $v_h(i,j)$ onto vertex map $v_o$. The head pose estimation engine 130 may implement projective data association to efficiently identify point correspondences between the surface defined by vertices $v_o(i,j)$ and the surface defined by vertices $v_h(i,j)$. For example, the head pose estimation engine 130 may identify point correspondences between the surfaces by finding corresponding vertices $v_o(i,j)$ and $v_h(i,j)$ that are substantially aligned along camera rays. In general, vertices in $v_o$ and $v_h$ that share the same pixel coordinate $(i,j)$ and that are within a 3D Euclidean distance of 3 centimeters are considered to be corresponding points. The head pose estimation engine 130 then updates the head pose $x$ assigned to the particle by reducing (e.g., minimizing) the point-to-plane error value $E_v(x)$. Alternatively, in some embodiments, a point-to-point error value or any other suitable error metric for comparing two 3D surfaces may be implemented to update the head pose $x$ assigned to one or more of the particles.

After all of the PSO generations and corresponding ICP iterations have been performed, the head pose estimation engine 130 selects the particle $x_g^*$ having the lowest error value across all generations. The head pose estimation engine 130 then provides the head pose $x$ associated with particle $x_g^*$ as the final head pose estimate for the head of the user in the current depth image 405.

Once the head pose has been estimated for the current depth image 405, the head pose estimation engine 130 updates the shape and/or weights of the 3D reference model 610 to better match the head of user observed in the current depth image 405 $d_o$. In various embodiments, the head pose estimation engine 130 identifies point correspondences between the vertices $v_h$ in the 3D reference model 610 (as transformed based on the final estimated pose $x_g^*$) and vertices $v_p$ in the observed depth data by projecting the vertices $v_h$ onto the vertices $v_o$ based on Equation 11. In Equation 11, R and t are a rotation matrix and translation vector parameterized by $x$, respectively, $v_p$ is the p-th element in the 3D reference model's 610 shape vector $S_k$, $v_p^o$ is a vertex in $v_o$ that corresponds to a vertex $v_p$, and $\delta$ is a distance threshold (e.g., equal to approximately 1 centimeter) for rejecting corresponding vertices that are too far apart.

$$[i\ j\ 1]^T = K(Rv_p + t),\ v_p^o = v_{o(i,j)} \quad \text{(Eq. 11)}$$

$$m_p = \begin{cases} 1 & \text{if } \|v_p^o - (Rv_p + t)\| < \delta \\ 0 & \text{otherwise} \end{cases}$$

A new set of coefficients α* is then computed by the head pose estimation engine 130 by minimizing α* according to Equation 12, where $V=(v_1^o, v_2^o, \ldots, v_n^o)$, and $M=\text{diag}(m_1, m_2, \ldots, m_n)$.

$$\alpha^* = \arg\min_\alpha \|M([\mu\Sigma_i\alpha_i s_i] - V)\|^2 \quad \text{(Eq. 12)}$$

The shape of 3D reference model 610 may further be updated based on Equation 13, where η is a damping parameter (e.g., equal to approximately 0.1) that may be introduced to prevent drastic changes to the shape of the 3D reference model 610 between depth images 405.

$$S_{k+1} = \eta(\mu + \Sigma_i\alpha_i^* s_i) + (1-\eta)S_k \quad \text{(Eq. 13)}$$

Additionally, the weighting coefficients applied to the 3D reference model 610 may be updated based on Equation 14, where $w_p$ and $v_p$ are the p-th elements in the weight vector $W_{k+1}$ and the shape vector $S_{k+1}$, respectively, and $\sigma_w$ is a scaling factor (e.g., equal to approximately 0.01).

$$w_p = \exp(-\|v_p - v_p^o\|^2/\sigma_w) \quad \text{(Eq. 14)}$$

Figure 8:
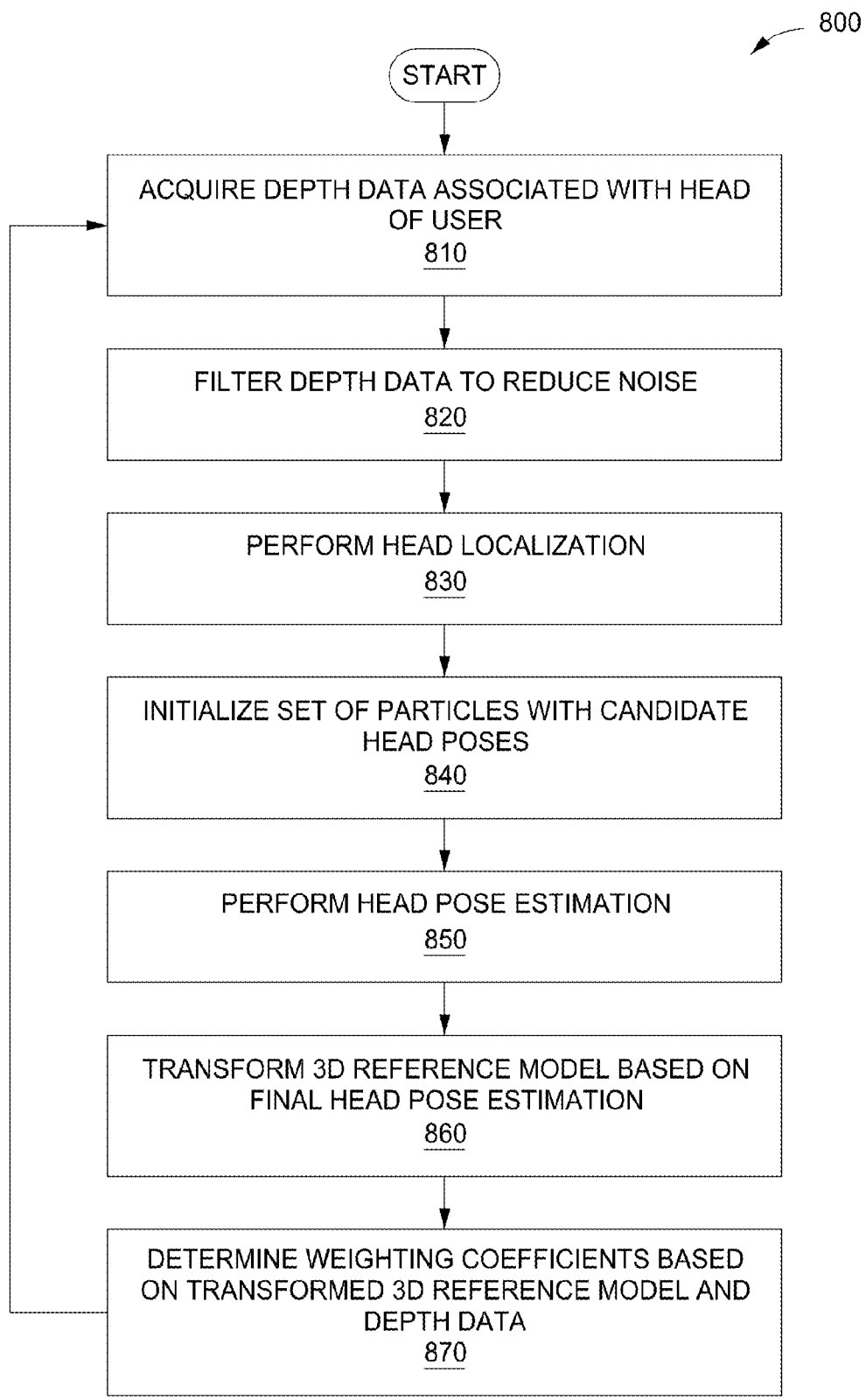
FIG. 8 is a flow diagram of method steps for estimating a head pose of a user, according to various embodiments of the present invention.

FIG. 8 is a flow diagram of method steps for estimating a head pose of a user, according to various embodiments of the present invention. Although the method steps are described in conjunction with the systems of FIGS. 1-7C, persons skilled in the art will understand that any system configured to perform the method steps, in any order, falls within the scope of the present invention.

As shown, a method 800 begins at step 810, where the head pose estimation engine 130 acquires depth data associated with the head of the user. In some embodiments, the head pose estimation engine 130 acquires depth data via a depth sensor, such as a time-of-flight sensor. At step 820, the head pose estimation engine 130 filters the depth data to remove unreliable data, which is commonly observed in depth data outputted by low-cost depth sensors. In some embodiments, the head pose estimation engine 130 filters the depth data by applying a bilateral filter.

At step 830, the head pose estimation engine 130 performs head localization to estimate the position of the head of the user within the depth image 405. Then, at step 840, the head pose estimation engine 130 initializes each particle included in the set of particles with a candidate head pose. In some embodiments, the particles are initialized by randomly sampling a normal distribution of head poses x having a mean set to a frontal head pose. For subsequent depth images 405, a first portion of the particles may be initialized randomly (e.g., as described above), and second a portion may be initialized based on the estimated head pose x associated with the previous depth image 405. As described above, each candidate head pose may include a rotation vector and a translation vector used to transform the 3D reference model 610. For example, in some embodiments, the head pose estimation engine 130 initializes each particle with a different 6-dimensional vector $x=(\theta_x, \theta_y, \theta_z, t_x, t_y, t_z)$, where $\theta_i$ and $t_i$ represent a rotation about and a translation along the axis i.

Next, at step 850, the head pose estimation engine 130 estimates the head pose of the user by performing one or more optimization passes on the initialized particles. In various embodiments, for each optimization pass, the head pose estimation engine 130 performs one or more iterative closest point (ICP) iterations for each particle and one or more particle swarm optimization (PSO) iterations for the set of particles. In some embodiments, the head pose estimation engine 130 implements one or more of the techniques ICP and/or PSO techniques described above to compare the 3D reference model 610 to incoming depth data and estimate the head pose of the user. However, in other embodiments, the head pose estimation engine 130 may implement any technically feasible combination of ICP and PSO to generate a head pose estimation. Additionally, in various embodiments, ICP may be substituted with any gradient descent local optimization technique.

At step 860, the head pose estimation engine 130 transforms the 3D reference model 610 based on the head pose estimation and, at step 870, determines weighting coefficients and/or shape changes to be applied to the 3D reference model 610. As described above, the head pose estimation engine 130 may determine one or more weighting coefficients by identifying point correspondences between vertices $v_h$ in the 3D reference model 610 and vertices $v_o$ in the observed depth data. The weighting coefficients and/or shape changes determined at step 870 are then implemented when analyzing the next depth image 405 to update the head pose of the user. The method 800 then returns to step 810, where the head pose estimation engine 130 acquires an additional depth image 405 and analyzes the depth image 405 based on the weighting coefficients and/or shape changes.

Figure 9A:
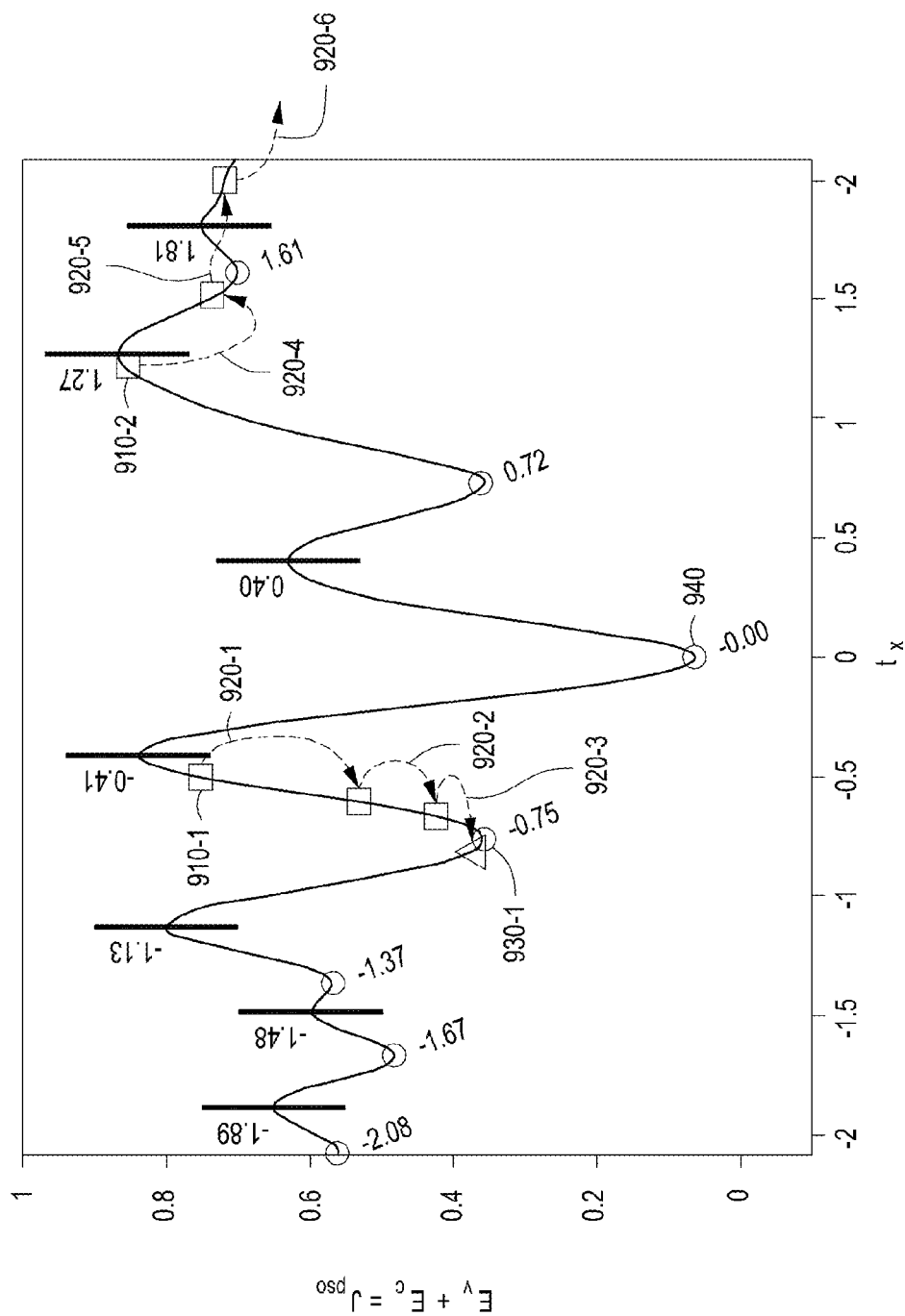
FIGS. 9A and 9B illustrate one-dimensional head pose estimates generated via an iterative closest point (ICP) technique and a particle swarm optimization (PSO) technique, respectively.
Figure 9B:
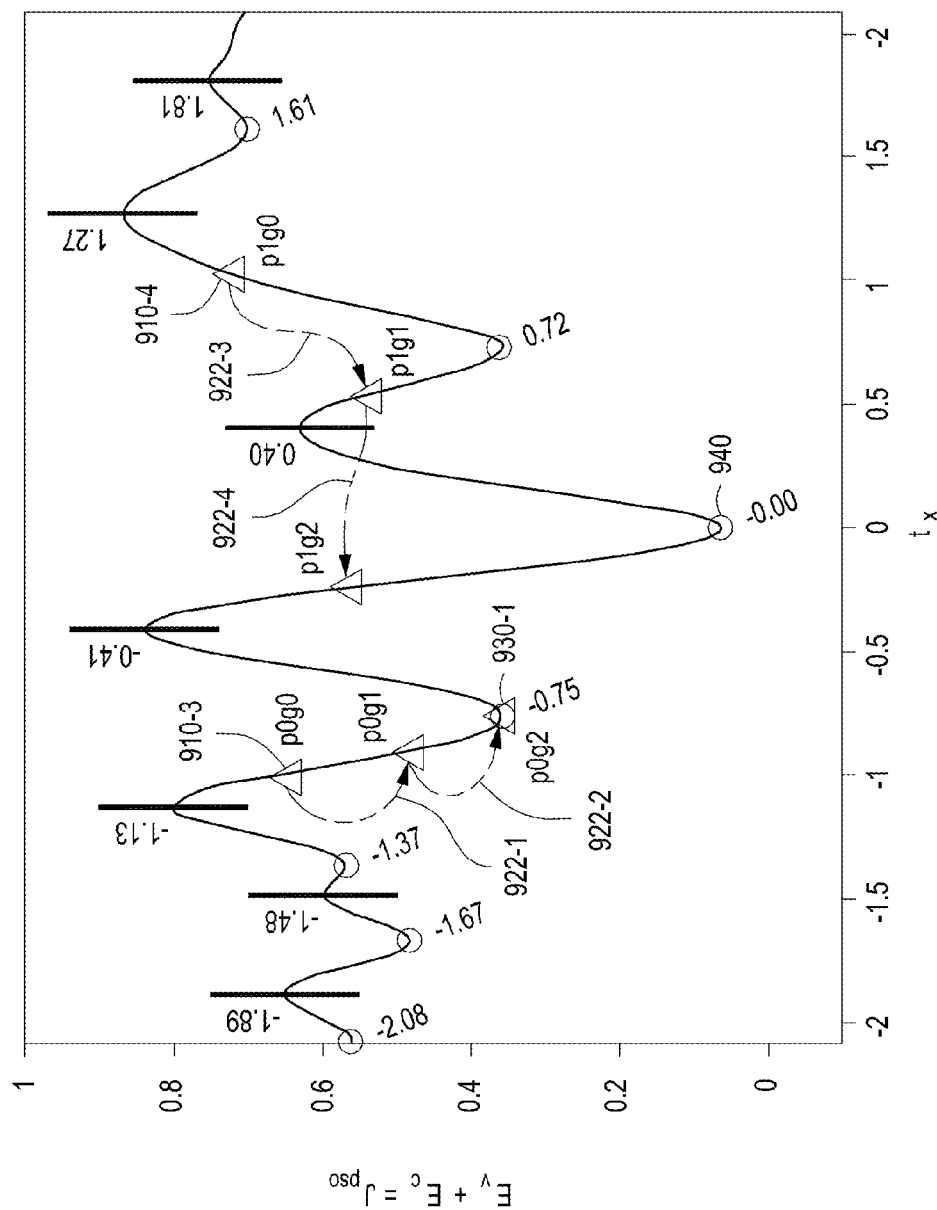

FIGS. 9A and 9B illustrate one-dimensional head pose estimates generated via ICP and PSO, respectively. Specifically, the technique illustrated in FIG. 9A implements ICP, but not PSO, to estimate the one-dimensional shift of a 3D reference model along the x-axis. Because ICP minimizes only one term ($E_v$) of the cost function shown in Equation 6, particle 910-2 converges towards a local minimum of $E_v$, not a local minimum of $E_c + E_v$. Accordingly, minima associated with ICP techniques may be at different locations than minima associated PSO techniques. Consequently, when only ICP is implemented, each of the particles 910-1, 910-2 misses the global best one-dimensional shift of the 3D reference model 610 along the x-axis.

Further, the technique illustrated in FIG. 9B implements PSO, but not ICP. Accordingly, as shown, with each PSO iteration 920, particle 910-3 quickly converges towards local best head pose 930-1, and particle 910-4 jumps across several local/global maximum and minimum error values. However, neither of the particles 910-1, 910-2 reaches the global best head pose 940.

Figure 9C:
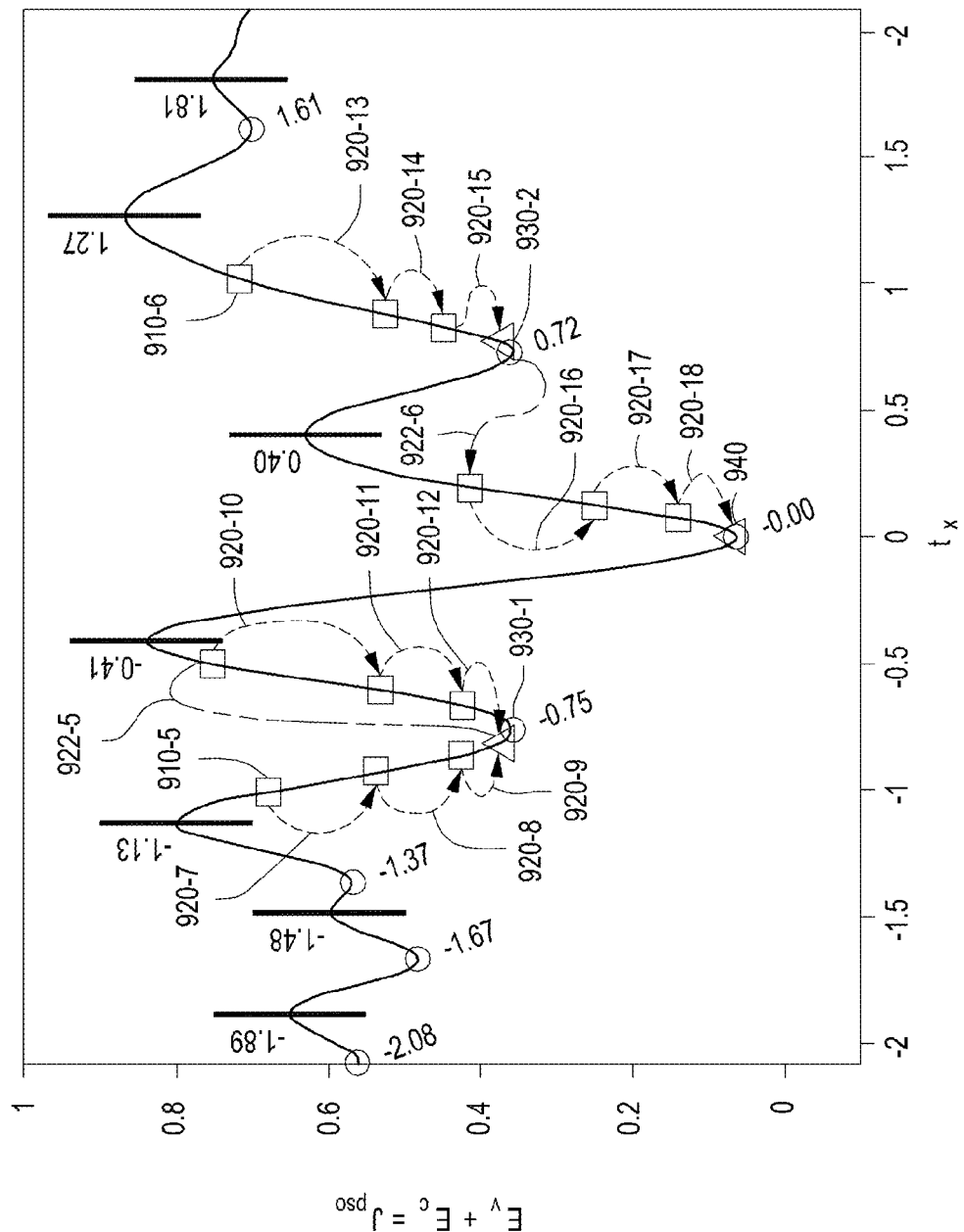
FIG. 9C illustrates one-dimensional head pose estimates generated via a technique that implements both iterative closest point (ICP) and particle swarm optimization (PSO), according to various embodiments of the present invention.

By contrast, FIG. 9C illustrates one-dimensional head pose estimates generated via a technique that implements both ICP and PSO, according to various embodiments of the present invention. As shown, with each ICP iteration 920 included in the first PSO generation, each particle 910-4, 910-5 quickly converges towards a local best head pose 930. Specifically, in FIG. 9C, the head pose estimation engine 130 determines multiple local best positions along one dimension (e.g., along the x-axis). However, PSO update 922-6 enables particle 910-6 to escape local best head pose 930-2 and converge towards global best head pose 940 (e.g., the global best position along the x-axis) during the second set of ICP iterations.

In sum, a head pose estimation engine acquires a depth image associated with a head of a user and determines the location of the head within the depth image. The head pose estimation engine then estimates the three-dimensional (3D) head pose of the user by comparing a 3D reference model to the depth image via an iterative closest point (ICP) technique and a particle swarm optimization (PSO) technique. Once a head pose estimate is determined, the head pose estimation engine determines one or more weighting coefficients to apply to the 3D reference model and/or updates the shape of the 3D reference model in order to more accurately process additional depth images.

At least one advantage of the techniques described herein is that a 3D head pose of a user can be efficiently determined regardless of lighting conditions. Additionally, the techniques described herein can be implemented with a wide variety of depth cameras without requiring a user to perform an initial calibration sequence, saving users both time and effort.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of sensors and algorithms that may acquire and process depth data associated with a head of a user, persons skilled in the art will appreciate that the systems and techniques described herein are applicable to other types of sensors and algorithms. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A non-transitory computer-readable storage medium including instructions that, when executed by a processor, cause the processor to estimate a head pose of a user, by performing the steps of:
acquiring depth data associated with a head of the user;
initializing each particle included in a set of particles with a different candidate head pose associated with a three-dimensional reference model; and
performing at least one optimization pass that comprises:
performing at least one iterative closest point (ICP) iteration for each particle in the set of particles, wherein each ICP iteration comprises:
rendering the three-dimensional reference model based on the candidate head pose associated with the particle,
comparing the three-dimensional reference model to the depth data to determine at least one error value, and
modifying the candidate head pose associated with the particle based on the at least one error value,
performing at least one particle swarm optimization (PSO) iteration, comprising:

updating a global best head pose associated with the set of particles, and
modifying at least one of candidate head poses associated with the set of particles based on the global best head pose, and
modifying the three-dimensional reference model based on the global best head pose.

2. The non-transitory computer-readable storage medium of claim 1, wherein comparing the three-dimensional reference model to the depth data to determine the at least one error value is based on at least one weighting coefficient associated with at least one vertex included in the three-dimensional reference model.

3. The non-transitory computer-readable storage medium of claim 2, further comprising, after performing at least one optimization pass, updating the at least one weighting coefficient based on the depth data and the global best head pose associated with the set of particles.

4. The non-transitory computer-readable storage medium of claim 3, wherein the three-dimensional reference model comprises a face region having a plurality of vertices, and the at least one weighting coefficient comprises a different weighting coefficient for each vertex included in the plurality of vertices.

5. The non-transitory computer-readable storage medium of claim 1, wherein acquiring the depth data associated with the head of the user comprises scaling an adaptive matched filter based on at least one distance included in the depth data, and aligning the adaptive matched filter with the depth data.

6. The non-transitory computer-readable storage medium of claim 5, wherein the adaptive matched filter includes a head region and a shoulder region.

7. The non-transitory computer-readable storage medium of claim 6, wherein aligning the adaptive matched filter with the depth data comprises:
analyzing the depth data to determine a silhouette of the user;
positioning the adaptive matched filter at a plurality of locations relative to the silhouette of the user;
for each of the plurality of locations:
multiplying each of a plurality of values included in the adaptive matched filter by a corresponding value associated with the silhouette of the user to determine a plurality of products; and
adding the plurality of products to determine a sum; and
determining which location has the highest sum.

8. The non-transitory computer-readable storage medium of claim 1, wherein modifying the shape of the three-dimensional reference model comprises modifying a shape of the three-dimensional reference model by estimating a difference between the shape of the three-dimensional reference model and the depth data, and updating the shape of at least a portion of the three-dimensional reference model based on the difference.

9. The non-transitory computer-readable storage medium of claim 1, further comprising:
acquiring additional depth data associated with the head of the user;
for each particle included in a first portion of the set of particles, initializing the particle with a different candidate head pose that is based on the global best head pose; and
for each particle included in a second portion of the set of particles, initializing the particle with a different candidate head pose that is not based on the global best head pose.

10. A computer system, comprising:
a memory storing a head pose estimation engine;
at least one sensor configured to acquire depth data associated with a head of a user; and
a processor coupled to the memory and the at least one sensor, wherein, when executed by the processor, the head pose estimation engine configures the processor to:
initialize each particle included in a set of particles with a different candidate head pose, wherein each candidate head pose comprises a rotation vector and a translation vector associated with a three-dimensional reference model; and
perform one or more optimization passes, wherein, each optimization pass comprises:
performing at least one iterative closest point (ICP) iteration for each particle, wherein each ICP iteration comprises:
rendering the three-dimensional reference model based on the candidate head pose associated with the particle,
comparing the three-dimensional reference model to the depth data to determine at least one error value, and
modifying the candidate head pose based on the at least one error value,
performing at least one particle swarm optimization (PSO) iteration, comprising:
updating a global best head pose associated with the set of particles, and
modifying at least one candidate head pose based on the global best head pose, and
modifying a shape of the three-dimensional reference model based on the depth data.

11. The computer system of claim 10, wherein comparing the three-dimensional reference model to the depth data to determine the at least one error value is based on at least one weighting coefficient associated with at least one vertex included in the three-dimensional reference model.

12. The computer system of claim 11, wherein the head pose estimation engine further configures the processor to, after performing at least one optimization pass, update the at least one weighting coefficient based on the depth data and the global best head pose associated with the set of particles.

13. The computer system of claim 12, wherein the three-dimensional reference model comprises a face region having a plurality of vertices, and the at least one weighting coefficient comprises a different weighting coefficient for each vertex included in the plurality of vertices.

14. The computer system of claim 10, wherein the head pose estimation engine further configures the processor to scale an adaptive matched filter based on at least one distance included in the depth data, and align the adaptive matched filter with the depth data to determine a location of the head of the user.

15. The computer system of claim 14, wherein the adaptive matched filter includes a head region and a shoulder region.

16. The computer system of claim 15, wherein the processor is configured to align the adaptive matched filter with the depth data by:
analyzing the depth data to determine a silhouette of the user;

positioning the adaptive matched filter at a plurality of locations relative to the silhouette of the user;

for each of the plurality of locations:

multiplying each of a plurality of values included in the adaptive matched filter by a corresponding value associated with the silhouette of the user to determine a plurality of products; and adding the plurality of products to determine a sum; and determining which location has the highest sum.

17. The computer system of claim 10, wherein the head pose estimation engine further configures the processor to modify the shape of the three-dimensional reference model by estimating a difference between the shape of the three-dimensional reference model and the depth data, and updating the shape of at least a portion of the three-dimensional reference model based on the difference.

18. The computer system of claim 10, wherein the at least one sensor is further configured to acquire additional depth data associated with the head of the user, and the head pose estimation engine further configures the processor to:

for each particle included in a first portion of the set of particles, initialize the particle with a different candidate head pose that is based on the global best head pose; and for each particle included in a second portion of the set of particles, initialize the particle with a different candidate head pose that is not based on the global best head pose.

19. A method for estimating a head pose of a user, comprising:

acquiring depth data associated with a head of the user;

initializing each particle included in a set of particles with a different candidate head pose; and performing at least one optimization pass that comprises:

performing at least one iterative closest point (ICO) iteration for each particle in the set of particles, wherein each ICP iteration comprises:

rendering a three-dimensional reference model based on the candidate head pose associated with the particle, comparing the three-dimensional reference model to the depth data to determine at least one error value, and modifying the candidate head pose associated with the particle based on the at least one error value, performing at least one particle swarm optimization (PSO) iteration to update a global best head pose associated with the set of particles, and modifying a shape of the three-dimensional reference model based on the depth data and the global best head pose.

20. The method of claim 19, wherein comparing the three-dimensional reference model to the depth data to determine the at least one error value is based on at least one weighting coefficient associated with at least one vertex included in the three-dimensional reference model.

* * * * *

UNITED STATES PATENT AND TRADEMARK OFFICE
CERTIFICATE OF CORRECTION

PATENT NO. : 9,830,703 B2
APPLICATION NO. : 14/825129
DATED : November 28, 2017
INVENTOR(S) : Gregory P. Meyer et al.

It is certified that error appears in the above-identified patent and that said Letters Patent is hereby corrected as shown below:

On the Title Page

(56) References Cited, Page 2:
Please delete "Bais et al., "Registering Multiview Range Data to Create 3d Computer Objects", IEEE Transactions on Pattern Analysis and Machine Intelligence, 1995, 17(8):820-824" and insert --Blais et al., "Registering Multiview Range Data to Create 3d Computer Objects", IEEE Transactions on Pattern Analysis and Machine Intelligence, 1995, 17(8):820-824--;

In the Claims

Column 21, Claim 8, Line 52, please delete "the shape of";

Column 24, Claim 19, Line 7, please delete "(ICO)" and insert --(ICP)--.

Signed and Sealed this
Thirteenth Day of March, 2018

Andrei Iancu
*Director of the United States Patent and Trademark Office*